UNITED STATES PATENT OFFICE.

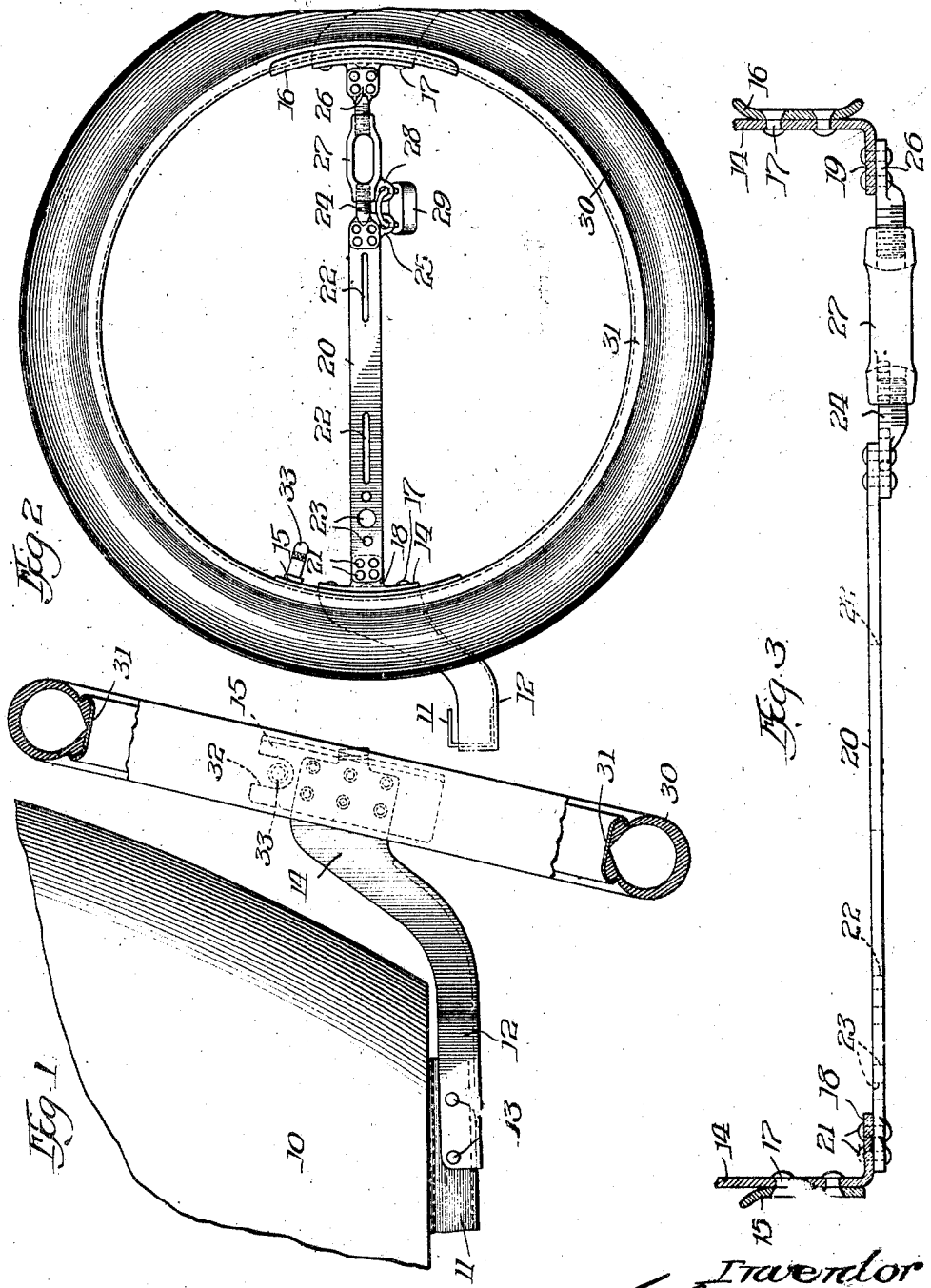

ETIENNE PLANCHE, OF FLINT, MICHIGAN.

TIRE-CARRIER.

1,311,993.            Specification of Letters Patent.            Patented Aug. 5, 1919.

Application filed March 20, 1918. Serial No. 323,494.

*To all whom it may concern:*

Be it known that I, ETIENNE PLANCHE, a citizen of the United States, and resident of Flint, in the county of Genesee and State of Michigan, have invented certain new and useful Improvements in Tire-Carriers, of which the following is a specification.

My invention relates to tire carriers for vehicles and particularly to a novel device of this character intended for use in the rear of a vehicle.

In the use of automobiles means are commonly employed for carrying an extra rim and inflated tire. Preferably the rim and tire are carried at the rear of the car and many devices have been suggested for holding the same. An object in the present invention is to provide a carrier which avoids the use of loose parts which may rattle or become lost and misplaced. To accomplish the result the part is made as a rigid structure securely riveted to the automobile frame and having but one movable part. The arms, which act as the supporting means, are riveted to the frame of the vehicle and converge, the ends of the arms being spaced apart a distance corresponding substantially to the inside diameter of the rim to be supported. To the outer end of each arm I secure a shoe having a contour corresponding substantially to that of the inner periphery of the rim. A rigid bar is riveted to the outer end of one of the arms and projects horizontally toward the outer end of the other arm. A turn-buckle is interposed between the end of the bar and the end of the arm, apertured lugs on the turn-buckle and bar providing for the accommodation of a lock. The clamping and releasing action is secured by deflecting or bending the arms. This is not injurious as the deflection necessary to clamp or release the rim is relatively small and, of course, is much less than the elastic limit of the arms. Thus a construction is provided in which there are no loose parts. It is therefore of extreme simplicity and lightness and in addition the bar which serves as a strut between the arms acts as a convenient support for the license plate and tail light.

The invention will be more readily understood by reference to the accompanying drawing, wherein, Figure 1 is a fragmentary side elevation showing the application of my device to the rear end of an automobile;

Fig. 2 is an end view thereof, and,

Fig. 3 is an enlarged transverse sectional view through the outer ends of the carrier.

In the drawings the rear portion of the body of the automobile is indicated at 10. This is secured in the usual manner to a frame, one of the channel-irons of which is shown at 11.

The arms which constitute the supports for the tire carrier are of a peculiar shape, as best shown in Figs. 1 and 2. The inner end 12, of each of the arms is in the form of an angle which coöperates with the channel-iron of the frame and is rigidly secured thereto by means of rivets 13. The outer end of each of the arms is in the form of a plate 14, the flange constituting the lower leg of the angle 12, being tapered off and terminated as shown. Secured to the outer ends of the arms are shoes 15, 16, having a contour corresponding to the arc of the rim intended to be mounted thereon. The shoe 16, is in the form of a channel; that is, it is provided with a flange at the two edges thereof, the rim being confined between such flanges. The shoe 15, however, has only a rear flange. It will be noted that the shoes are rigidly secured to the plates 14, by means of the countersunk rivets 17.

At the outer ends of the arms I provide tongues 18, 19, of metal, these tongues being similarly formed. A rigid, horizontally extending bar 20, is secured to the tongue 18, by means of the rivets 21. This bar is of substantial size and may be provided with slots 22, by means of which a license plate may be secured thereto. Apertures 23, may be utilied for securing a tail lamp thereto. The opposite end of the bar 20, is provided with a threaded portion 24, which may be as shown, a separate piece riveted to the bar. An apertured lug 25, is formed as a part of the said portion. A threaded member 26, is riveted to the tongue 19, which projects from one of the arms and a turnbuckle 27, is employed to complete the strut extending between the two arms. An apertured ear 28, is formed on the turn-buckle and is so positioned that when desired, the hasp of a padlock 29, may engage the two apertured ears 25, 28, for locking the parts in their adjusted positions.

It will be noted that the shoe 15, is provided with a notch 32, in one end thereof, as best shown in Fig. 1. The notch is so located as to permit the tire valve 33, to be seated therein, this result being secured by first placing the tire on the shoes with the valve adjacent to the notched end of the shoe, then rotating the tire in a counter-clockwise direction until the valve engages with the notch.

The tire 30, mounted on a rim 31, is shown in place and held by the shoes. The arrangement is such that when the turn-buckle is rotated in one direction the shoes will be drawn toward each other by deflecting the arms. This deflection need be only such as is necessary to reduce the clamping effect of the shoes and permit the rotation of the tire to free the valve from the notch in the shoe and then the disengagement of the tire from the shoe 15; that is, from the shoe which is provided only with the rear flange. When a tire has been replaced by a reversal of the steps described, the turn-buckle is reversely rotated and a powerful clamping effect is secured. The natural resiliency of the metal will, if the parts are properly adjusted, serve to retain the tire even though the force of the turn-buckle is not employed. In that case the turn-buckle is not employed only to overcome the resiliency of the arms and hold the arms in such position as to permit the tire to be inserted.

The fundamental advantage in a construction such as described is that there are no loose parts. There is in fact but one movable part and this is so formed that it cannot by any possibility be removed, particularly when a tire is in place. The simplicity of the clamping means and the ease with which it may be locked without the use of chains or similar loose parts makes it desirable from the user's as well as the manufacturer's standpoint. It will be noted also that the tire may be securely held in place even though the clamps do not securely grip the same; this for the reason that the tire must first be rotated to disengage the valve from its interlocking engagement with the carrier before it can be removed.

It will be understood that the device is capable of much modification and such modifications as are within the scope of my claims I consider within the spirit of my invention.

I claim:

1. In a tire carrier for automobiles, the combination of a rigid frame, a pair of arms secured thereto and projecting rearwardly therefrom, a rim-engaging shoe secured to the extremity of each arm, a rigid strut connecting the free ends of the arms, and a turn-buckle in the strut, one of said shoes having an end notch adapted to be engaged by a tire valve upon a rotative movement of the tire, substantially as described.

2. In a tire holder, the combination with the frame of a vehicle, of a pair of arms of angular cross-section at their inner ends, said inner ends being adapted to interfit with and be secured to the longitudinal members of said frame, the outer ends of the arms being flat, the flat portions extending substantially vertically, shoes carried by the outer ends of the arms and means extending between the arms adapted to bend the arms to permit the insertion and removal of a tire from the shoes, substantially as described.

3. In a tire-rim holding device, the combination of a pair of flexible arms, a shoe secured to the outer end of each arm, one shoe having a recess within which the rim is received by a lateral movement of the rim, the other shoe being unflanged at its outer edge to permit of the sliding engagement of the rim therewith without lateral movement of the rim, means associated with the latter shoe adapted to engage a projection on the rim or tire by a rotary movement of the rim, and means for holding the rim with the projection in engagement with said means, substantially as described.

4. In a tire-rim holding device, the combination of a pair of flexible arms, a shoe secured to the outer end of each arm, one shoe having a recess within which the rim is received by a lateral movement of the rim, the other shoe being unflanged at its outer edge to permit of the sliding engagement of the rim therewith without lateral movement of the rim, said last named shoe having a notch adapted to engage a tire valve by a bodily rotary movement of the rim and tire, and means for holding the rim and tire with the valve in said notch, substantially as described.

5. In a tire-rim holding device, the combination of a pair of flexible arms, a shoe secured to the outer end of each arm, one shoe having a recess within which the rim is received by a lateral movement of the rim, the other shoe being unflanged at its outer edge to permit of the sliding engagement of the rim therewith without lateral movement of the rim, said last named shoe having a notch adapted to engage a tire valve by a bodily rotary movement of the rim and tire, and screw means for flexing said arms to clamp a rim with the tire valve in engagement with said notch, substantially as described.

6. In a tire holding device the combination of a pair of arms, a double flanged shoe secured to one arm, and a shoe secured to the other arm, the last named shoe being unflanged on its outer side to permit of the entrance of the rim thereon without lateral movement and being provided with a notch in one end adapted to engage a tire valve, and means acting between said arms adapted to flex the same and clamp a rim in position on said shoes, substantially as described.

7. In a tire-rim holding device, the combination of a pair of flexible arms, a shoe secured to the outer end of each arm, one shoe having a recess within which the rim is received by a lateral movement of the rim, the other shoe being unflanged at its outer edge to permit of the sliding engagement of the rim therewith without lateral movement of the rim, means for flexing the arms to frictionally hold the rim in position, and additional means for positively holding the rim against movement laterally away from the shoes, substantially as described.

Signed at Flint, Michigan, this 13th day of February, 1918.

ETIENNE PLANCHE.